United States Patent
Moore et al.

(10) Patent No.: US 10,921,008 B1
(45) Date of Patent: Feb. 16, 2021

(54) INDOOR COMFORT CONTROL SYSTEM AND METHOD WITH MULTI-PARTY ACCESS

(71) Applicant: Braeburn Systems LLC, Montgomery, IL (US)

(72) Inventors: Glenn A Moore, Geneva, IL (US); Daniel S Poplawski, Oswego, IL (US)

(73) Assignee: Braeburn Systems LLC, Montgomery, IL (US)

( * ) Notice: Subject to any disclaimer, the term of this patent is extended or adjusted under 35 U.S.C. 154(b) by 57 days.

(21) Appl. No.: 16/004,680

(22) Filed: Jun. 11, 2018

(51) Int. Cl.
*F24F 11/32* (2018.01)
*H04L 29/08* (2006.01)
(Continued)

(52) U.S. Cl.
CPC .............. *F24F 11/32* (2018.01); *F24F 11/58* (2018.01); *F24F 11/64* (2018.01); *F24F 11/89* (2018.01);
(Continued)

(58) Field of Classification Search
CPC ......... F24F 11/32; F24F 11/58; H04L 67/125; H04L 67/20; H04L 67/32; H04L 63/0807; H04L 63/0823; H04L 63/108
See application file for complete search history.

(56) References Cited

U.S. PATENT DOCUMENTS 2,054,039 A 9/1936 Persons
2,060,636 A 11/1936 Persons
(Continued)

FOREIGN PATENT DOCUMENTS

JP 58065977 4/1983
JP 2004218436 8/2004
JP 2006009596 1/2006

OTHER PUBLICATIONS

ComfortLink II XL950 Control, User Guide, Trane U.S. Inc., 2011.
(Continued)

*Primary Examiner* — Thomas J Dailey
*Assistant Examiner* — Lam H Duong
(74) *Attorney, Agent, or Firm* — The Law Offices of Konrad Sherinian, LLC (57) ABSTRACT

An indoor comfort control system for controlling an indoor comfort system includes a microprocessor, a display, wireless transceiver and a specialized control system computer program. The control is accessible over the Internet via the transceiver. The control is diagnosed and configured by a third-party operating a third-party communication device. The control communicates with the third-party communication device over the Internet. The multi-party access is granted by a principal of the control, and communicated to the third-party communication device by a cloud server system. The control receives connection requests and commands from the third-party communication device over the Internet. The control further communicates responses to the third-party communication device over the Internet. The connection can be timed out based on an access time limit set by the principal. The date and time of the multi-party access is configured by the principal via the principal communication device and the cloud server system.

10 Claims, 8 Drawing Sheets

(51) Int. Cl.
  *F24F 11/58* (2018.01)
  *F24F 11/64* (2018.01)
  *F24F 11/89* (2018.01)
  *G05B 15/02* (2006.01)
  *F24F 140/00* (2018.01)
  *G06F 3/041* (2006.01)

(52) U.S. Cl.
  CPC ............ *G05B 15/02* (2013.01); *H04L 67/125* (2013.01); *H04L 67/20* (2013.01); *H04L 67/32* (2013.01); *F24F 2140/00* (2018.01); *G06F 3/041* (2013.01)

(56) References Cited

U.S. PATENT DOCUMENTS

| | | |
|---|---|---|
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | McPherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,420,794 A | 12/1983 | Anderson |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,289,362 A | 2/1994 | Liebl et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Penno |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,211,782 B1 | 4/2001 | Sandelman et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Moore |
| 7,992,794 B2 | 8/2011 | Leen et al. |
| 8,066,263 B1 | 11/2011 | Soderlund |
| 8,083,154 B2 | 12/2011 | Schultz et al. |
| 8,091,795 B1 | 1/2012 | McLellan |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |

(56) References Cited

U.S. PATENT DOCUMENTS

| | | |
|---|---|---|
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,304,676 B2 | 4/2016 | Poplawski |
| 9,989,273 B2 | 6/2018 | Read et al. |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0230402 A1 | 11/2004 | Jean |
| 2004/0245352 A1 | 12/2004 | Smith |
| 2004/0256472 A1 | 12/2004 | DeLuca |
| 2004/0260427 A1 | 12/2004 | Wimsatt |
| 2005/0027997 A1 | 2/2005 | Ueno et al. |
| 2005/0033707 A1 | 2/2005 | Ehlers |
| 2005/0040248 A1 | 2/2005 | Wacker |
| 2005/0040249 A1 | 2/2005 | Wacker |
| 2005/0044906 A1 | 3/2005 | Spielman |
| 2005/0082836 A1 | 4/2005 | Lagerwey |
| 2005/0108620 A1 | 5/2005 | Allyn et al. |
| 2005/0119793 A1 | 6/2005 | Amundson et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman, Jr. et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0045263 A1 | 2/2009 | Mueller et al. |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0261465 A1 | 10/2010 | Rhoads et al. |
| 2010/0318200 A1 | 12/2010 | Foslien |
| 2011/0004825 A1 | 1/2011 | Wallaert et al. |
| 2011/0031806 A1 | 2/2011 | Altonen et al. |
| 2011/0046791 A1 | 2/2011 | Sakae |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0024685 A1 | 1/2013 | Kolavennu et al. |
| 2013/0032414 A1 | 2/2013 | Yilmaz |
| 2013/0056989 A1 | 3/2013 | Sabhapathy |
| 2013/0090767 A1 | 4/2013 | Bruck et al. |
| 2013/0123991 A1 | 5/2013 | Richmond |
| 2013/0211783 A1 | 8/2013 | Fisher et al. |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0081465 A1 | 3/2014 | Wang et al. |
| 2014/0098247 A1 | 4/2014 | Rao |
| 2014/0152631 A1 | 6/2014 | Moore et al. |
| 2014/0156087 A1 | 6/2014 | Amundson |
| 2014/0163746 A1 | 6/2014 | Drew |
| 2014/0200718 A1* | 7/2014 | Tessier ............... G05D 23/1902 700/276 |
| 2014/0254577 A1 | 9/2014 | Wright et al. |
| 2014/0316581 A1 | 10/2014 | Fadell et al. |
| 2014/0319233 A1 | 10/2014 | Novotny |
| 2015/0081568 A1 | 3/2015 | Land, III |
| 2015/0095843 A1 | 4/2015 | Greborio et al. |
| 2015/0100167 A1 | 4/2015 | Sloo et al. |
| 2015/0127174 A1* | 5/2015 | Quam ..................... F24F 11/64 700/276 |
| 2015/0167995 A1 | 6/2015 | Fadell |
| 2015/0233595 A1 | 8/2015 | Fadell |
| 2015/0280935 A1 | 10/2015 | Poplawski et al. |
| 2015/0370615 A1* | 12/2015 | Pi-Sunyer .............. G05B 15/02 700/276 |
| 2016/0047569 A1 | 2/2016 | Fadell et al. |
| 2016/0062618 A1 | 3/2016 | Fagan |
| 2016/0123618 A1 | 5/2016 | Hester et al. |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2016/0241566 A1* | 8/2016 | Khurana ............... H04L 63/102 |
| 2017/0102681 A1 | 4/2017 | Verhoeven et al. |
| 2017/0103689 A1 | 4/2017 | Moore et al. |
| 2017/0131825 A1 | 5/2017 | Moore et al. |
| 2017/0223005 A1* | 8/2017 | Birgisson .............. H04L 63/083 |
| 2017/0300025 A1 | 10/2017 | Moore et al. |
| 2017/0314797 A1* | 11/2017 | Blair ....................... F24F 11/30 |
| 2017/0337522 A1* | 11/2017 | Bennett ................. G06Q 10/20 |
| 2017/0364104 A1 | 12/2017 | Poplawski et al. |
| 2018/0005195 A1 | 1/2018 | Jacobson |
| 2018/0031266 A1 | 2/2018 | Atchison |
| 2018/0074471 A1* | 3/2018 | Poplawski ............... F24F 11/62 |

OTHER PUBLICATIONS

Cardio Iie Installer's Guide, System Version 2.5xx, 5th edition, 2008, Secant Home Automation Inc.

What you should know about flexible displays (FAQ); http://news.cnet.com/8301-1035_3-57607171-94/what-you-should-know-about-flexible-d . . . ; Nov. 25, 2013.

Brae8urn Systems LLC, "Temperature Limiting Adjustments for heating and Cooling (1000 Series)", Mportant Installation Instructions.

* cited by examiner

INDOOR COMFORT CONTROL SYSTEM AND METHOD WITH MULTI-PARTY ACCESS

CROSS REFERENCE TO RELATED APPLICATIONS

NONE.

FIELD OF THE DISCLOSURE

The present invention generally relates to indoor comfort control systems, and more particularly relates to an indoor comfort control system that supports multi-party access. More particularly still, the present disclosure relates to an indoor comfort control system connecting to the Internet for supporting multi-party access.

DESCRIPTION OF BACKGROUND

Heating, ventilation and air conditioning ("HVAC") are well-known indoor comfort systems. Humidity regulation systems are another example of indoor comfort systems. Indoor comfort control systems are used to configure, operate and control indoor comfort systems that regulate the environment within buildings and are more frequently linked via the Internet for web-enabled building control. The Internet connection allows receipt of instructions from a remote and/or mobile device. However, there are many levels of complexity that can lead to problems with the operation of the indoor comfort control systems and require repair by a contractor. Many wireless network communication protocols exist, such as Bluetooth®, DSRC®, EnOcean®, IrDA®, Redlink®, RFC®, Wi-Fi® or Zigbee®. These wireless network communications can provide a link to components such as routers, hubs, sensors, computers, mobile phones or tablets and thermostats. A multitude of software and graphical user interfaces may be used to attempt to set-up and control the indoor comfort control systems. All of this complexity can lead to layers of technical problems for the systems' principal users. As used herein, a principal user of an indoor comfort control system (such as a thermostat) can be an owner, a property manager, a house keeper, a tenant or any other types of users with access of a house or a building.

In particular, many users have difficulty with set-up and repair procedures when there are a multitude of steps required to fix the components of the systems. The present invention overcomes many of such difficulties and provides for access to the system by third parties such as contractors who are provided with easy connection between a remote device and an indoor comfort control.

OBJECTS OF THE DISCLOSED SYSTEM, METHOD, AND APPARATUS

Accordingly, it is an object of this disclosure to provide an indoor comfort control that supports multi-party access over the Internet.

Another object of this disclosure is to provide an indoor comfort control that controls an indoor comfort system and supports multi-party access over the Internet.

Another object of this disclosure is to provide an indoor comfort control that is accessible by a third-party over the Internet.

Another object of this disclosure is to provide an indoor comfort control that is accessible by a third-party over the Internet with the multi-party access granted by a principal.

Another object of this disclosure is to provide an indoor comfort control that is accessible by a third-party over the Internet with the multi-party access granted by a principal communication device.

Another object of this disclosure is to provide an indoor comfort control that is accessible by a third-party communication device with an access time limit.

Another object of this disclosure is to provide an indoor comfort control that is accessible by a third-party communication device on a predetermined date and time with an access time limit.

Another object of this disclosure is to provide an indoor comfort control that is accessible by a third-party communication device via a cloud server system.

Another object of this disclosure is to provide an indoor comfort control that is accessible by a third-party communication device via a cloud server system that bridges the communication between a principal communication device and the third-party communication device.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides an indoor comfort control for controlling an indoor comfort system. The thermostat includes a processing unit, a display device operatively coupled to the processing unit, a user input device operatively coupled to the processing unit, and a wireless transceiver operatively coupled to the processing unit. The wireless transceiver is adapted to communicate with a wireless router to access the Internet. The thermostat also includes an indoor comfort control computer program running on the processing unit. The thermostat computer program is adapted to receive a connection request from a third-party communication device over the Internet. The connection request is made at a date and a time that are received from a cloud server system. The connection request also includes an access token. The thermostat computer program is further adapted to authenticate the connection request based on the access token. When the authentication is successful, the thermostat computer program sends a connection confirmation to the third-party communication device over the Internet, receives a command from the third-party communication device, processes the command; and provides a response to the command to the third-party communication device over the Internet.

Further in accordance with the present teachings is a method for providing multi-party access to an indoor comfort control over the Internet. The method is performed by a cloud server system and includes receiving a service request for a third-party to access an indoor comfort control over the Internet from a principal communication device over the Internet. The thermostat is adapted to control an indoor comfort system. The method also includes, in response to the service request, generating a third-party request based on the service request. The third-party request indicates the thermostat. Moreover, the method includes sending the third-party request to a third-party communication device over the Internet; receiving a confirmation from the third-party request over the Internet that the third-party request has been accepted, the third-party request indicates the thermostat; and forwarding the confirmation to the principal communication device over the Internet. The service request indicates a date and a time and the third-party request indicates the date and the time as well. In a further implementation, the service request indicates an access time limit and the third-party request also indicates the access time limit.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
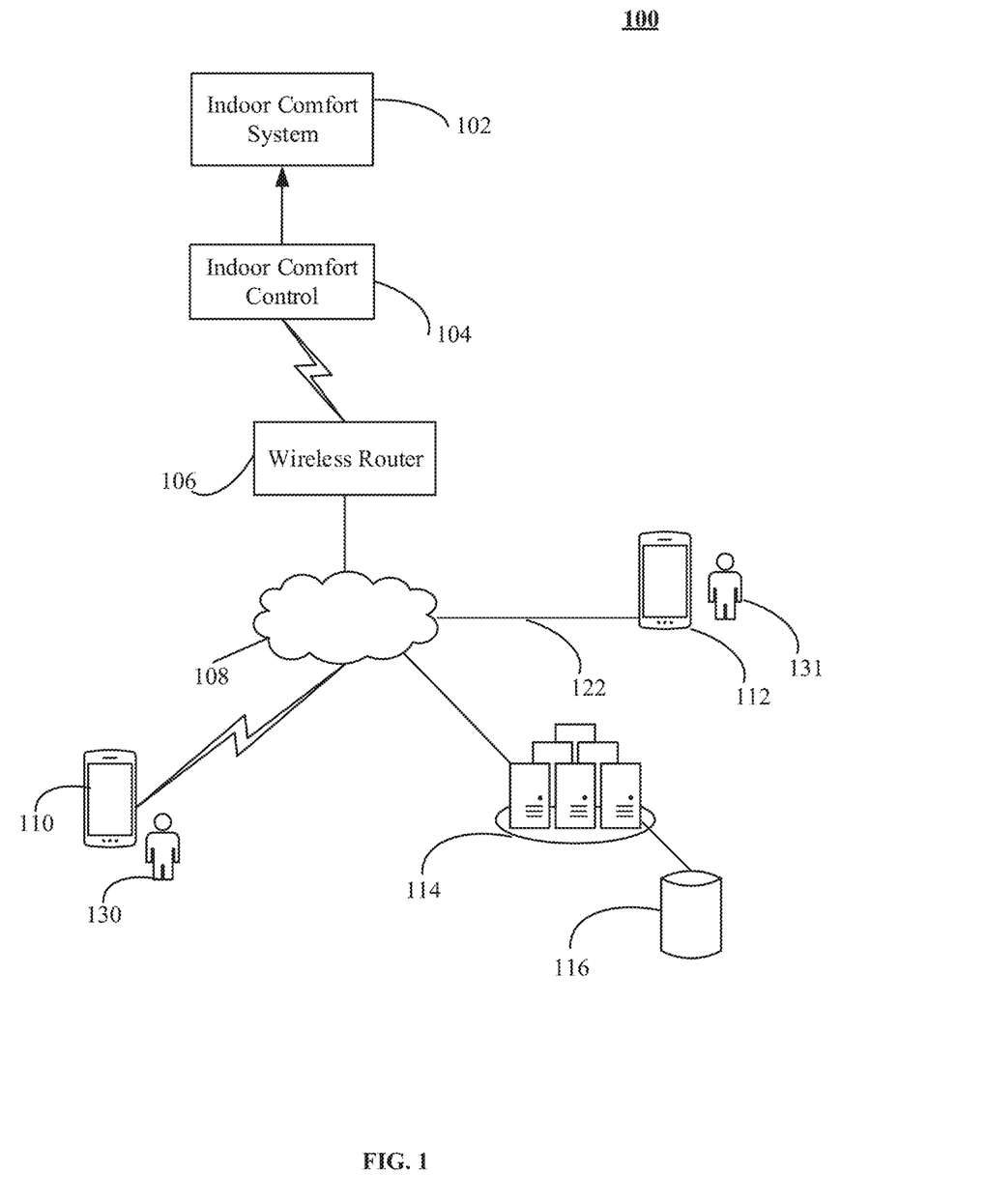
FIG. 1 is a simplified block diagram illustrating an environment regulation system in accordance with this disclosure.

Turning to the Figures and to FIG. 1 in particular, a block diagram of an environment regulation system is shown and generally indicated at 100. The illustrative environment regulation system 100 includes an indoor comfort system 102 (such as a heating system, a ventilation system, a humidity control system or an air conditioning system) that regulates an environment, an indoor comfort control 104 that operatively coupled to and controls the indoor comfort system 102, a wireless router 106 (such as a Wi Fi router) through which the thermostat 104 communicates with the Internet 108, a third-party communication device 110 accessing the Internet 108 via a wireless link (such as a Wi Fi network or a public cellular network) or a wired network connection, a principal communication device 112 (different from the device 110) operated by a principal 131 of an environment which the indoor comfort system 102 regulates, a cloud server system 114 operatively coupled to the Internet 108, and a database system 116 operatively coupled to the cloud server system 114.

The communication devices 110-112 can be smartphones, laptop computers, desktop computers, tablet computers, PDA computers or other types of computers allowing users to access the Internet and communicate with other computers and the cloud server system 114. Each of the communication devices 110-112 includes a processing unit, some amount of memory operatively coupled to the processing unit, a networking interface operatively coupled to the processing unit, an operating system running on the processing unit and a specialized computer software program.

The cloud server system 114 can be implemented as a single server, a server farm or a cloud based server system. The cloud server system 114 runs a specialized server software program to communicate with the communication devices 110-112. The cloud server system 114 accesses the database system 116 to store and retrieve data.

Figure 2:
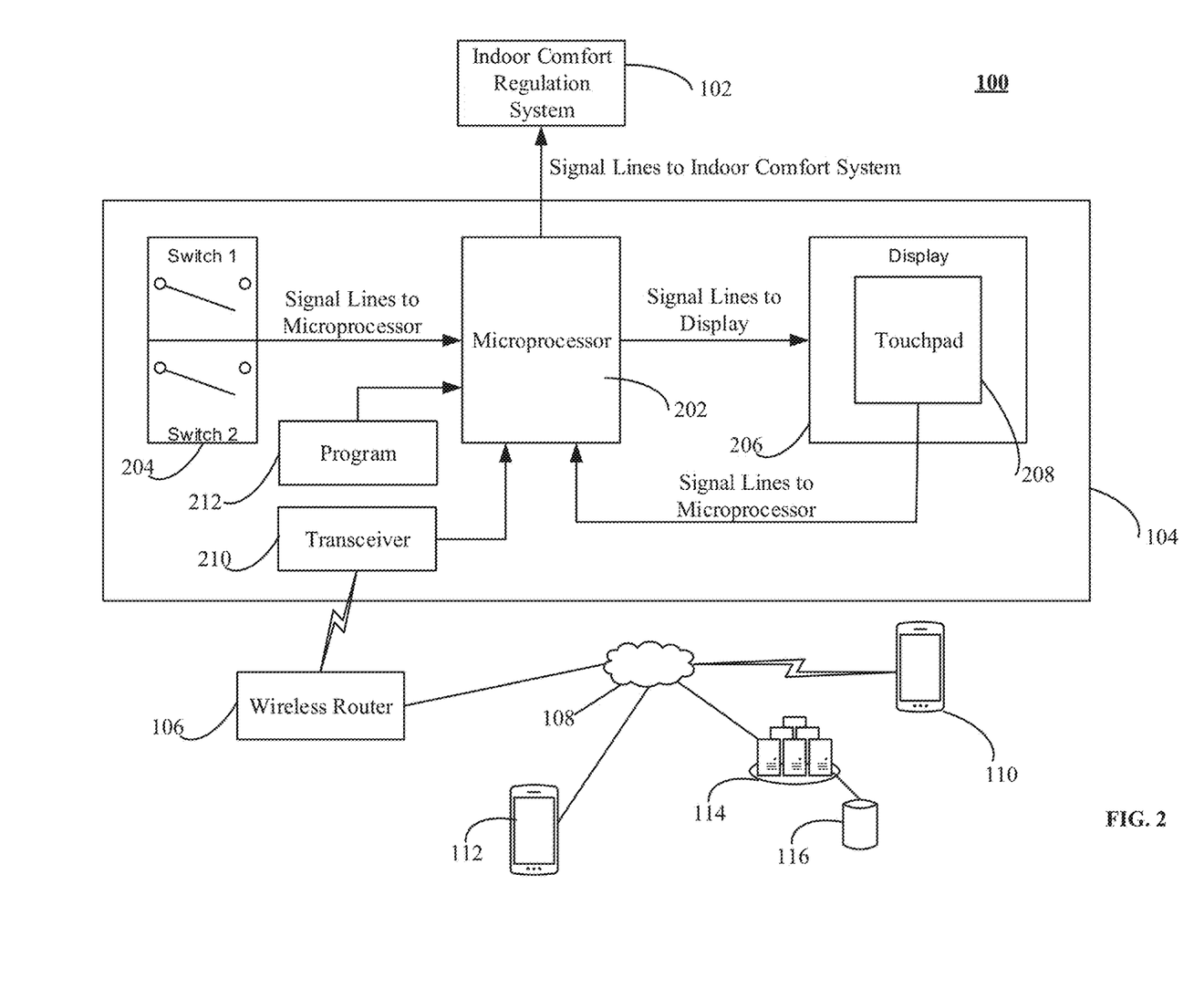
FIG. 2 is a simplified block diagram illustrating an environment regulation system in accordance with this disclosure.

The environment regulation system 100 is further illustrated by reference to FIG. 2. Referring now to FIG. 2, the illustrative thermostat 104 includes a processing unit 202, a set of switches 204 operatively coupled to the processing unit 202 for operating the thermostat 104, a display device 206 operatively coupled to the processing unit 202, a transceiver 210 operatively coupled to the processing unit 202 and communicating with the wireless router 106, and a specialized indoor comfort control computer program 212 executed by the processing unit 202. In one implementation, the display device 206 includes a touchpad 208 as a user input device to the thermostat 104. The user input device can also be a keypad or rotary switch. In accordance with the present teachings, the display device 206 does not incorporate any user input device (such as the touchpad 208) in a different implementation. The specialized computer program 212 displays thermostat data (such as statuses, instructions, temperature, humidity level, etc.) on the display device 206. Furthermore, the specialized computer program 212 retrieves user input entered via the touchpad 208.

Figure 7:
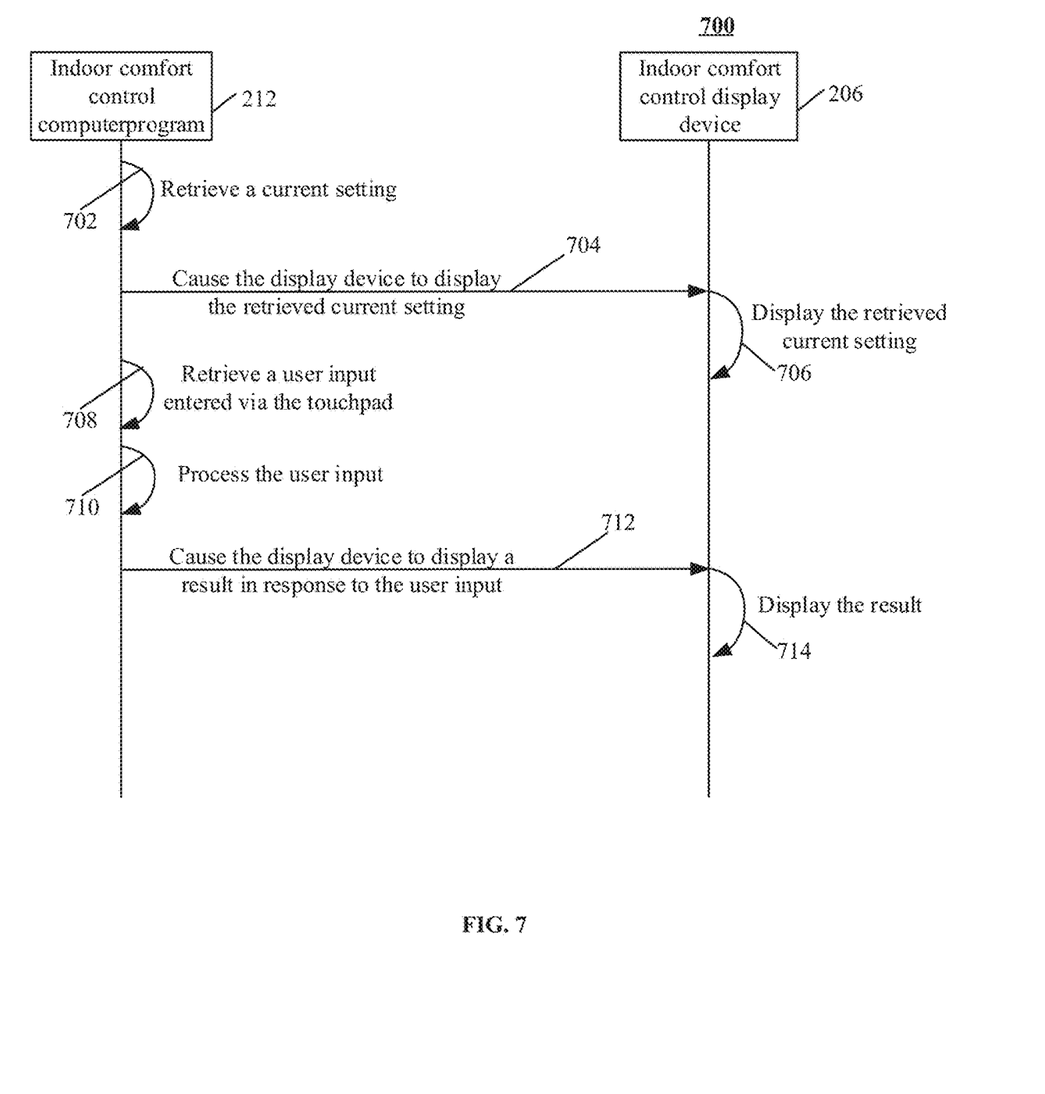
FIG. 7 is a sequence diagram illustrating an indoor comfort control operation in accordance with this disclosure.

The interaction between the specialized computer program 212 and the display device 206 is further illustrated by reference to FIG. 7. Turning to FIG. 7, a sequence diagram depicting the operation of the thermostat 206 is shown and generally indicated at 700. At 702, the specialized thermostat computer program 212 retrieves a current setting of the thermostat 104. At 704, the specialized thermostat computer program 212 causes the display device 206 to display the retrieved current setting. For example, the program 212 calls an Application Programming Interface ("API") provided by the thermostat 104 to display the setting. At 706, the display device 206 displays the setting. The elements 702-706 are usually performed frequently. For example, they are performed when the thermostat 104 is powered up or reset, and when the principal 131 operates the touchpad 208 to view and/or change current settings of the thermostat 104.

When the principal 131 operates the touchpad 208 to enter an input, such as a new temperature setting point, at 708, the specialized thermostat computer program 212 retrieves the user input. At 710, the specialized thermostat computer program 212 processes the retrieved user input. When the result of the processed user input needs to be displayed on the display device, at 712, the specialized thermostat computer program 212 causes the display device 206 to display the result. At 714, the display device 206 displays the result.

The specialized computer program running on the principal communication device 112 communicates with the cloud server system 114 over the Internet 108. The principal communication device 112 connects to the Internet 108 with a network link 122, which can be a wired or wireless link (such as a WiFi link). The cloud server system 114 associates the thermostat 104 with the principal's account maintained by the cloud server system 114 and stored in the database system 116. The account includes, for example, an identifier (such as serial number) of the thermostat 104, a model number of the thermostat 104, and identification information of the principal 131. The information of the principal 131 may include the address where the thermostat 104 is installed. As used herein, the identification information for identifying the thermostat 104 and the principal 131 is referred to as a personal identification ("PID"). In one implementation, the PID may also include an access code to the thermostat 104. The access code can be generated for each access to the thermostat. Alternatively, the access code remains consistent between different accesses to the thermostat 104.

Figure 3:
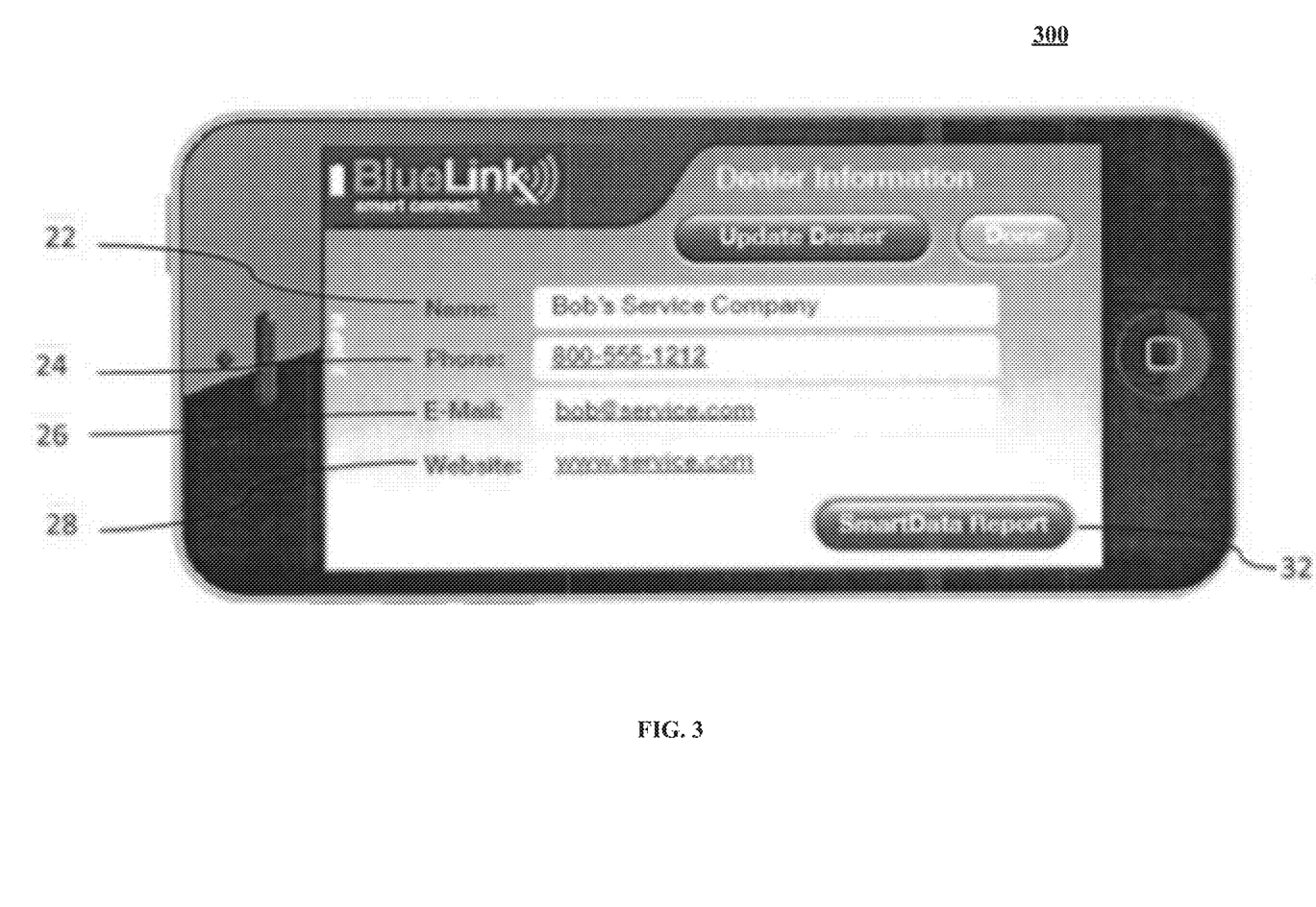
FIG. 3 is an illustrative screen of a principal communication device for configuring a third-party in accordance with this disclosure.

A conventional thermostat is only accessible and configurable by people standing next to it, but not remotely. Furthermore, the conventional thermostat is not accessible remotely by third-parties, such as a professional repairing thermostats. The present teachings resolves this issue by providing multi-party access to the thermostat 104. To grant multi-party access to the thermostat 104, the principal 131 operates the principal communication device 112 to initiates the process. For example, the principal 131 operates the principal computer program (such as a mobile app) running on the device 112 to configure and grant multi-party access to the third-party 130 access to the thermostat 104. In one implementation, the principal 131 accesses the screen 300 shown in FIG. 3 and displayed on the device 112 to configure a third-party, such as an indoor comfort control repair professional or an indoor comfort control technical support professional. The screen 300 includes a name field 22, a phone field 24, an E-mail field 26, and a Website field 28 for specifying a dealer. The screen 300 also includes a button 32 for generating reports.

Figure 4:
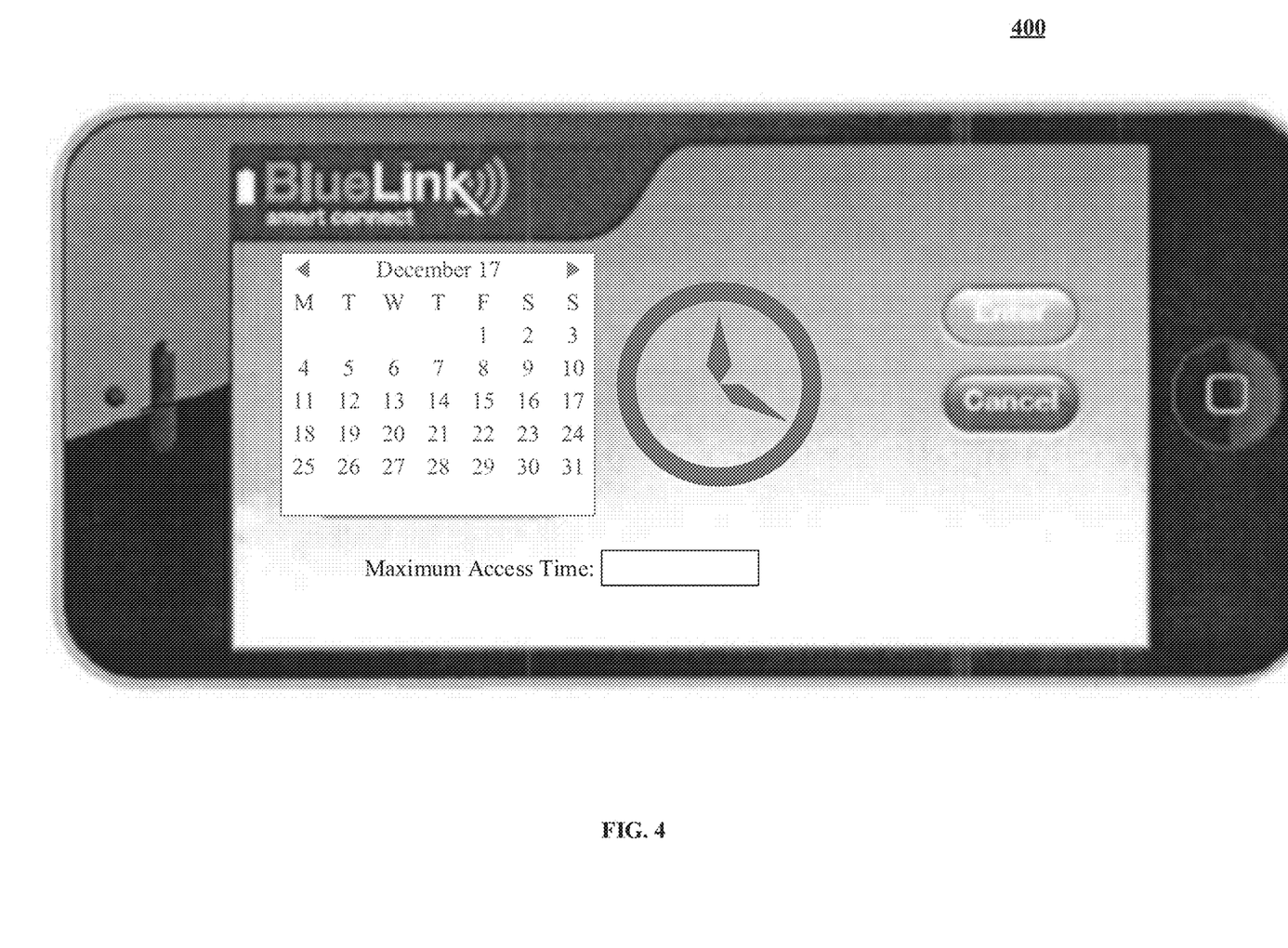
FIG. 4 is an illustrative screen of a principal communication device for configuring a third-party access to an indoor comfort control in accordance with this disclosure.
Figure 5:
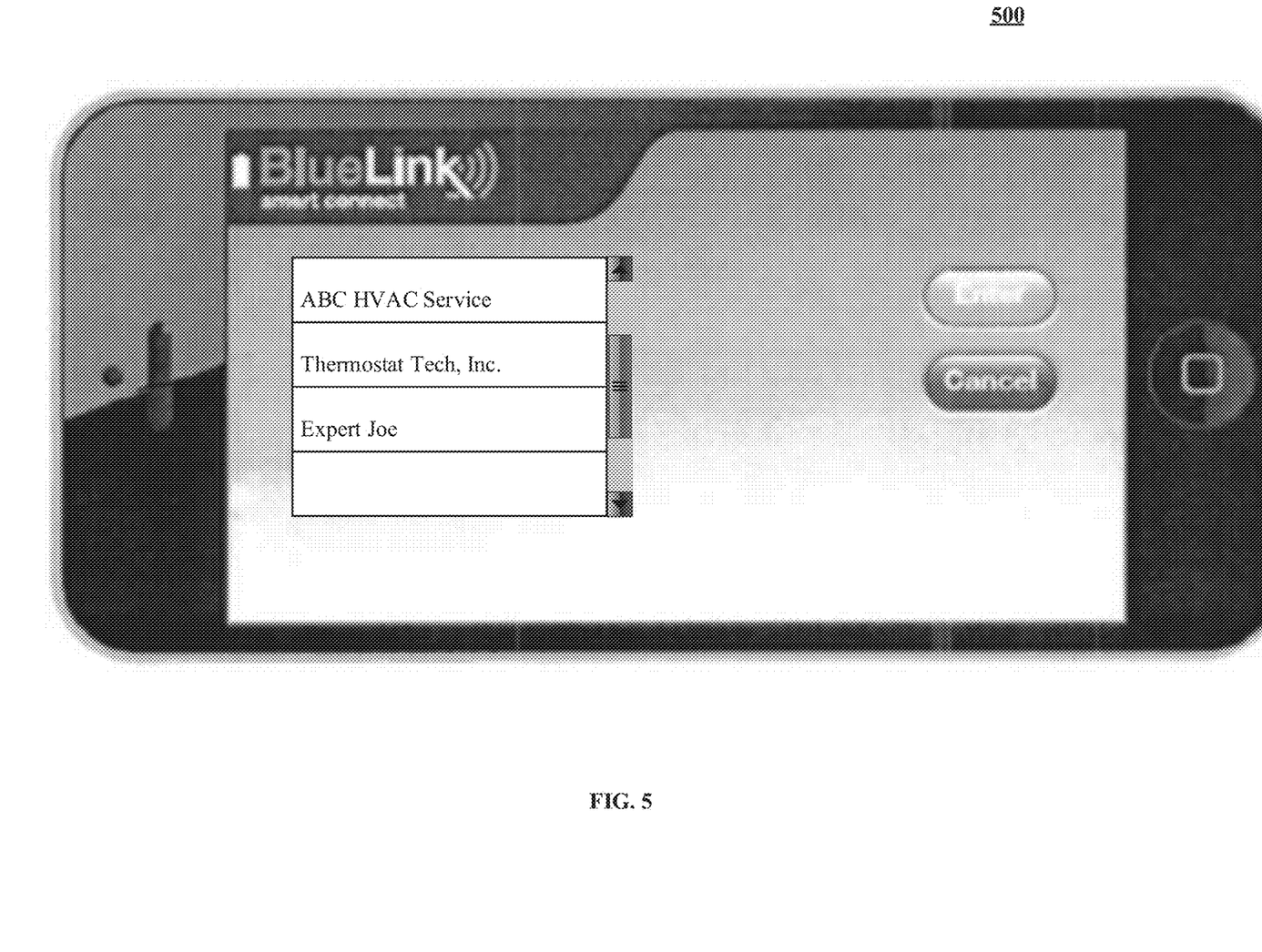
FIG. 5 is an illustrative screen of a principal communication device for selecting a third-party to grant multi-party to an indoor comfort control in accordance with this disclosure.

In addition to selecting a particular third-party (such as the dealer 130), the present teachings further allows the principal 131 to specify a particular date and time, and an access time for the third-party 130 to access the thermostat 104. Referring to FIG. 4, an illustrative screen 400 shown on the device 112 allows the principle 131 to select a date, a time and a maximum access time for the third-party 130 to access the thermostat 104. The third-party 130 is allowed to access the thermostat 104 only at the specified date and time for the specified maximum amount of time. Once the maximum amount of is reached, the third-party 130 is timed out and can no longer access the thermostat 104 unless a new access is granted. The access time limit can be in, for example, minutes. The selection of a third-party is illustrated in FIG. 5, which shows a simplified screen 500 for the principle 131 to select a particular dealer to access the thermostat 104. The multi-party access process is further illustrated by reference to FIG. 6.

Figure 6:
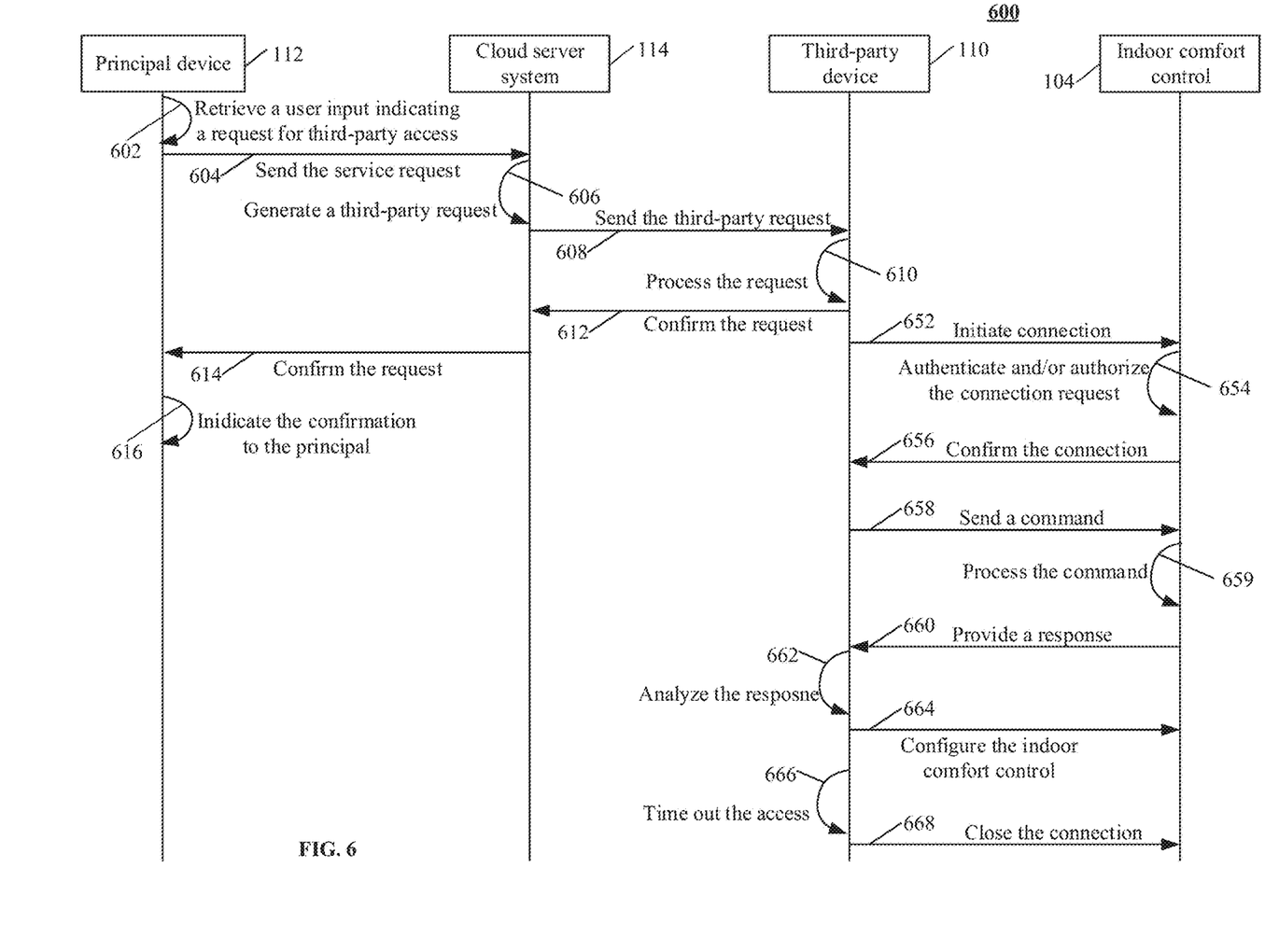
FIG. 6 is a sequence diagram illustrating a process by which multi-party access is granted and conducted in accordance with this disclosure.

Turning to FIG. 6 now, a sequence diagram depicting the process by which the thermostat 104 allows multi-party access is shown and generally indicated at 600. At 602, the principal computer program (such as a mobile app) running on the device 112 retrieves a user input indicating a request to engage the third-party 130 to access the thermostat 104. At 604, the principal computer program sends the service request to the cloud server system 114. The service request indicates the selected third-party 130, the access date and time, and the access time limit. At 606, the server software application running on the cloud server system 114 receives the service request, and generates a third-party request.

The cloud server software application determines the account of the principal 131 and associates account data with the service request. The third-party request indicates the access date and time, the access time limit. In addition, the third-party request identifies the thermostat 104. The identification of the thermostat 104 is, for example, a PID that provides sufficient information to enable the third-party device 110 to connect and communicate with the thermostat 104. In one implementation, the third-party request includes an access authentication and/or authorization token. The access token allows the thermostat 104 to authenticate and/or authorizes the third-party device 110 when the thermostat 104 is accessed remotely by the third-party device 110. The access token includes the PID. In a further implementation, the access token also includes a security check that is generated by the cloud server system 114 and can be interpreted by the thermostat 104.

At 608, the cloud server software application sends the third-party request to the third-party communication device 110. The third-party request can be implemented in one message or multiple messages. At 610, the third-party computer software program running on the device 110 receives the third-party request, and processes it. For example, the program displays an indication of the request to the third-party 130. The third-party 130 may accept or deny the request. When the third-party 130 accepts the third-party request, at 612, the third-party computer software program sends a confirmation message to the cloud server system 114. In response, at 614, the cloud server software application forwards the confirmation to the principal device 112. At 616, the principal computer program receives the confirmation, and indicates that the service request has been accepted to the principal 131.

At the access date and time indicated by the third-party request, the third-party 130 operates the third-party computer program to access the thermostat 104. At 652, third-party computer program initiates a connection to the thermostat 104 over the Internet. The connection request includes, for example, the access token. At 654, the thermostat 104 receives the connection request, and authenticates and/or authorizes the connection request. At 656, the thermostat 104 notifies the third-party device 110 that the connection has been made. At 658, the third-party computer program sends one or more commands to the thermostat 104 over the Internet. Each command can direct the thermostat 104 to perform an action, return certain data, or both. At 659, the commands are then received and processed by the thermostat 104. At 660, in response to the one or more commands, the thermostat 104 returns a response to the third-party device 110 over the Internet.

At 662, the third-party computer program analyzes the response. In a further implementation, the third-party computer program indicates the response by displaying it to on a screen of the device 110. At 664, the third-party computer program configures the thermostat 104. For instance, the third-party computer program sends commands and corresponding parameters to the thermostat 104. After the access to the thermostat 104 is done, at 668, the third-party computer program terminates the connection to the thermostat 104.

When an access time limit is specified, the third-party computer program monitors the time of access to the thermostat 104. When the limit is reached, at 666, the third-party computer program times out. In such a case, the third-party computer program can no longer communicate with the thermostat 104. In alternate implementation, the access time limit is enforced by the thermostat 104.

Figure 8:
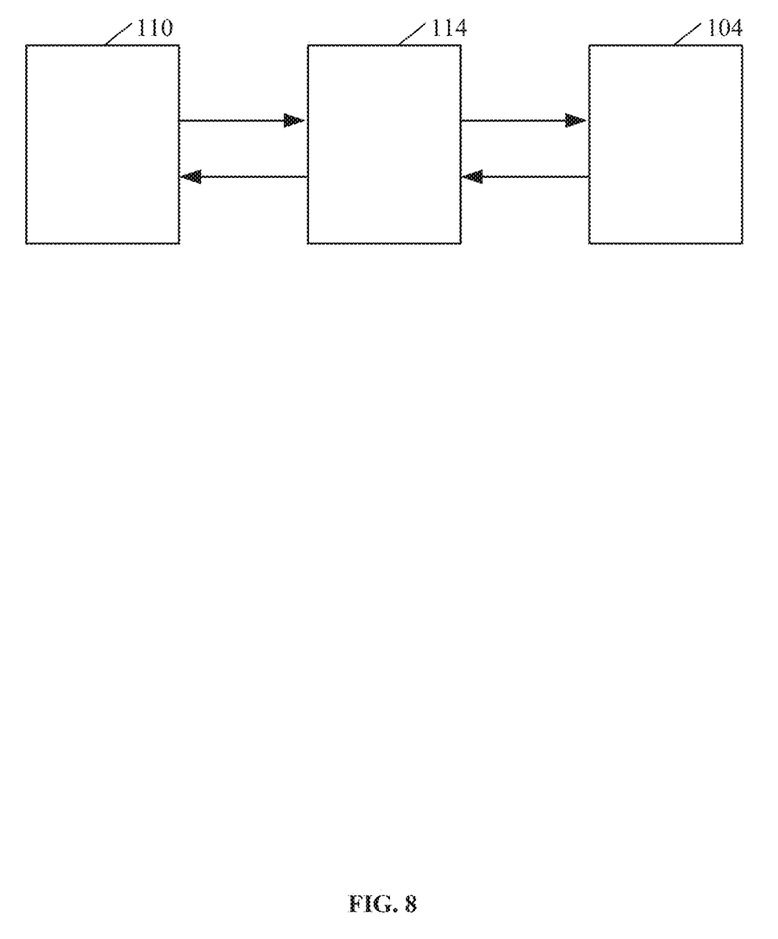
FIG. 8 is a block diagram illustrating communication between a third-party communication device and an indoor comfort control in accordance with this disclosure.

Obviously, many additional modifications and variations of the present disclosure are possible in light of the above teachings. Thus, it is to be understood that, within the scope of the appended claims, the disclosure may be practiced otherwise than is specifically described above. As an example, the communication between the third-party communication device 110 and the thermostat 104 is bridged by the cloud server system 114 as shown in FIG. 8.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. An indoor comfort control for controlling an indoor comfort system, the indoor comfort control comprising:
   i) a processing unit;
   ii) a display device operatively coupled to said processing unit;
   iii) a wireless transceiver operatively coupled to said processing unit, said wireless transceiver adapted to communicate with a wireless router to access the Internet;
   iv) a specialized indoor comfort control computer program running on said processing unit;
   v) said specialized indoor comfort control computer program adapted to:
      1) receive a remote connection request from a third-party mobile communication device over the Internet to form a connection between said indoor comfort control and said third-party mobile communication device, said connection request corresponding to a third-party request, wherein:
         a) said third-party request is initiated by a principal communication device and indicates an access date and time, an access time limit and said indoor comfort control;
         b) said third-party mobile communication device is not said principal communication device;
         c) said connection corresponds to said access date and time and is subjected to said access time limit for said third-party mobile communication device to access said indoor comfort control, and wherein
         d) said third-party mobile communication device is adapted to confirm said third-party request to a cloud server system over the Internet;
      2) receive a command from said third-party mobile communication device remotely over the Internet through said cloud server system, wherein said command directs said indoor comfort control to perform an action or return data;
      3) process said command; and
      4) provide a response to said command to said third-party mobile communication device remotely over the Internet through said cloud server system.

2. The indoor comfort control of claim 1 wherein said indoor comfort control is a thermostat.

3. The indoor comfort control of claim 1 wherein said third-party request further includes an access token for said indoor comfort control to authenticate or authorize said third-party mobile communication device when said third-party mobile communication device attempts to connect to said indoor comfort control remotely over the Internet through said cloud server system.

4. The indoor comfort control of claim 1 further comprising a user input device operatively coupled to said processing unit wherein said user input device is a touchpad.

5. The indoor comfort control of claim 1 wherein said indoor comfort system is one of a heating system, a ventilation system, a humidity control, or an air conditioning system.

6. The indoor comfort control of claim 1 wherein said indoor comfort control is a thermostat.

7. The indoor comfort control of claim 6 wherein said indoor comfort system is one of a heating system, a ventilation system, a humidity control, or an air conditioning system.

8. A method for providing multi-party access to an indoor comfort control, the method performed within a cloud server system and comprising:
   i) receiving a service request for a third-party to remotely access an indoor comfort control over the Internet through said cloud server system, said indoor comfort control adapted to control an indoor comfort system, remotely communicate with both a principal communication device and a third-party communication device via said cloud server system over the Internet, wherein said service request is initiated by the Principal communication device and indicates an access date and time, an access time limit, and said indoor comfort control;
   ii) generating a third-party request based on said service request, said third-party request indicating said indoor comfort control; and
   iii) confirming said third-party request with said third-party communication device wherein:
      1) said third-party communication device is adapted to remotely initiate a connection with said indoor comfort control over the Internet through said cloud server system, wherein said connection is subjected to said access date and time and access time limit;

2) said third-party communication device is adapted to remotely send a command to said indoor comfort control over the Internet through said cloud server system;
3) in response to said command, said indoor comfort control is adapted to perform an action against said indoor comfort system or return data; and
4) said indoor comfort control is adapted to return a response to said third-party communication device over the Internet through said cloud server system.

9. The method for providing multi-party access of claim 8 wherein said indoor comfort control is a thermostat.

10. The method for providing multi-party access of claim 8 wherein said indoor comfort system is one of a heating system, a ventilation system, a humidity control, or an air conditioning system.

* * * * *